US007307710B2

(12) United States Patent
Gatsios et al.

(10) Patent No.: US 7,307,710 B2
(45) Date of Patent: Dec. 11, 2007

(54) SURVEYING METHODS AND APPARATUS

(75) Inventors: Georgios Gatsios, Akersberga (SE); Roger Hoglund, Westminster, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 11/159,431

(22) Filed: Jun. 20, 2005

(65) Prior Publication Data
US 2006/0023203 A1 Feb. 2, 2006

Related U.S. Application Data

(63) Continuation-in-part of application No. PCT/SE03/02028, filed on Dec. 19, 2003.

(51) Int. Cl.
*G01B 11/26* (2006.01)
(52) U.S. Cl. .................................. 356/139.01
(58) Field of Classification Search ............ 356/139.01
See application file for complete search history.

(56) References Cited

U.S. PATENT DOCUMENTS

| 5,100,229 | A | * | 3/1992 | Lundberg et al. ........... 356/3.12 |
| 6,034,722 | A | | 3/2000 | Viney et al. |
| 6,035,254 | A | * | 3/2000 | Nichols ....................... 701/213 |
| 6,175,328 | B1 | | 1/2001 | Ericsson et al. |
| 2005/0057745 | A1 | * | 3/2005 | Bontje ........................ 356/139.03 |

FOREIGN PATENT DOCUMENTS

| JP | 11 166 831 | 6/1999 |
| WO | WO 90 12284 | 10/1990 |
| WO | WO 95 34849 | 12/1995 |

OTHER PUBLICATIONS

WIT2410 2.4GHz Spread Spectru Wireless Industrial Transceiver Integration Guide, Cirronet Inc., Norcross, Georgia, 2000-2004 (48 pages).
SiteNet 9000 Operation Manual, Trimble Navigation Limited, Sep. 2000 (64 pages).
Certified Wireless Network Professional, WLAN Glossary, LEVER Technology Group PLC, 2003 (8 pages).

(Continued)

*Primary Examiner*—Thomas H. Tarcza
*Assistant Examiner*—Luke D. Ratcliffe
(74) *Attorney, Agent, or Firm*—Bruce D. Riter

(57) ABSTRACT

The invention relates to a surveying system, comprising at least one total station unit (210, 220), and at least one target (201, 203), said targets having wireless communication means, each unit provided with a unique wireless communication address for wireless communication, the wireless communication to be used to activate a selected total station (210, 220) to identify and measure the location of a chosen target (201, 203) in relation to a relative reference system, each target having identification means to be used by the total station for identification of the chosen target, each total station having identifying means used for identification of the chosen target to be measured. The invention also relates to a target and a method for surveying using the total stations and the targets according to the system.

15 Claims, 7 Drawing Sheets

OTHER PUBLICATIONS

Motorola's Mobile Mesh Networks Technology, Motorola, Inc., 2004 (2 pages).

Understanding Ad Hoc Mode, Jupitermedia Corporation, 2002 (2 pages).

ZyAIR G-2000 802.11g Wireless 4-port Router, ZyXEL Communications Corp., 2004 (2 pages).

ZyAIR G-3000 802.11g Dual-RF Business Access Point/Bridge/Repeater, ZyXEL Communications Corp., 2004 (2 pages).

* cited by examiner

SURVEYING METHODS AND APPARATUS

CROSS REFERENCE TO RELATED APPLICATIONS

This is a continuation-in-part of co-pending International Application PCT/SE2003/002028, with an international filing date of 19 Dec. 2003 and designating the United States of America, the content of which is incorporated herein by this reference. Priority benefit under 35 USC 119 is claimed of patent application number 0203830-5 filed in Sweden on 20 Dec. 2002, the content of which is incorporated herein by this reference.

FIELD OF THE INVENTION

The present invention generally relates to surveying and more specifically to a surveying system including several surveying units for surveying and equipment such as targets, radio receivers and methods and means for co-operation between such units.

BACKGROUND OF THE INVENTION

The art of surveying involves the determination of unknown positions or setting out of known coordinates using angle and distance measurements taken from one or more known positions. In order to make these measurements a surveying device frequently used is a total station. The device is generally operated by two users, one user pointing the total station at a target held by a second user.

The user traditionally makes the pointing optically, using a telescope. Robotic total stations have been developed which assist the user in locating the target and aligning to it. The robotic total stations include servomotors that allow the apparatus to be rotated to automatically align the station with the target. The automatic alignment can be done either against the reflector used for distance measurement, in which case a separate light (IR or visible) beam is sent from the robotic total station and reflected back from the reflector, or the target may be equipped with a light source.

In both cases the total station is equipped with an optical receiver to receive the alignment signal reflected from the reflector or transmitted from the light source, to be processed and used to automatically align the total station against the target. A system using both possibilities is disclosed in EP 0 465 584.

These robotic total stations can automatically find a target, lock to it and follow the target if it is moved. There are a number of different methods used to enable the total station to find a target. Normally these methods include scanning a certain "window" or angle, and locking on any target within the window.

With this type of more complex total station the user may be only one person and he is then normally working at the target in order to choose the point to be measured or mark the point to be set out. By giving commands via a radio link the user can make the station search for the target and lock to it. When the user once has marked all points to be marked on the site which are accessible for the total station, the total station has to be moved to a new location in order to measure further points on the site.

To move the total station requires not only the physical movement of the apparatus, but also, every time the station is moved, the exact location and orientation of the station has to be determined anew. The measurements have to be exact in order to correlate the new measurements to the earlier by establishing the location and the orientation of the station in relation to known reference points. Understandably this takes time, typically 30 minutes or more, and the users dependent on the total station for staking out will then have to wait, not only for the station to be moved, but also for the location and direction to be established in the new position.

This need of relocation of the total station arises on large sites to be surveyed for different reasons, e.g. the direct line of sight is obstructed by a building or a mound, or the like, or when doing surveying work for constructions of roads or runways etc. where the work site covers extensive stretches of land.

However on large building sites, more than one measuring crew may be working in the same area. This means there is a risk of a total station locking on the wrong target.

One way of aiding a total station to quickly find a target (e.g., reduce scanning time or need for scanning) is described in U.S. Pat. No. 6,035,254 wherein a surveying system using a navigation GPS receiver at the target for determination of the coarse position of the target is described. The target thereafter transmits to a total station position information estimating location of the target. The total station is then aligned coarsely with the target and can lock on it.

The prior art does not address the problem of selecting a specific target among several possible targets, when the targets appear to be closely located as viewed from the total station. A further problem is encountered when several targets and several total stations are located on the same general site; the problem of unique identification of all elements in the survey for proper linking of target with total station is further compounded when there are different users in the same general site.

SUMMARY OF THE INVENTION

For the purpose of this description and claims the following expressions are to be understood as follows:

Identification means are means that identify in a chosen manner a target to any other member of the system.

Identifying means are means being part of the total station for identification of a specific target.

Unique wireless communication address for each unit is the address used in wireless communication between different units during measurements, i.e. target, total station, memory device. The unique address may also be used in registering the gathered measurements.

Embodiments in accordance with the invention have one or more advantages, such as 1. enabling interaction between total stations and targets,
2. enabling a total station to lock on a specific target making certain that it is the intended target.
3. allowing a target to ask for assistance, i.e., having a specific total station locking on it.
4. having the position of any one target in the system measured by more than one total station,
5. allowing use of a common target for several measurements,
6. facilitating selection of one target among several, when the separation of the targets is large enough to exclude unwanted targets,
7. enabling increased accuracy of the measurements,
8. providing a greater radio range and better transfer of data.

Embodiments in accordance with the present invention provide systems and methods for determining positions, comprising one or more total station(s) and one or more target(s), wherein each unit comprises a two way wireless data communication device to be able to communicate with all possible units in the system in a radio net, each unit having a unique address to be used to enable exchange of commands or data between certain units.

Embodiments of a surveying system in accordance with the invention comprise at least one total station unit, and at least one target unit, said units having wireless communication system means, each unit provided with a unique address for wireless communication, the wireless communication usable for activating a selected total station to identify and measure the location of a chosen target, each target having identification means used by the total station for identification of the chosen target, each total station having identifier means used for identification the chosen target to be measured.

The location may according to embodiments of the invention be measured in relation to a relative reference system.

A system according to embodiments of the invention may further have identification means of each target in the system comprising a modulated light source, each of the targets exhibiting different modulation schemes for the respective light sources, the identification being the selected modulation scheme.

Further in accordance with embodiments of the invention the system identification means of each target in the system may comprise a light source of which the modulation scheme may be set from measurement to measurement such as to give the light sources of targets close to each other different modulation schemes, the identification being the selected modulation scheme.

Further in accordance with embodiments of the invention the identification means of each target in the system may comprise a satellite-positioning system receiver, the identification being the approximate location given by the positioning system.

Further in accordance with embodiments of the invention each target is provided with wireless communication means, and a unique wireless communication address for wireless communication, the wireless communication to be used to activate a selected total station to identify and measure the location of the target in relation to a relative reference system, the target having identification means to be used by the total station for identification of the chosen target.

Further in accordance with embodiments of the invention the identification means of the target may comprise a modulated light source, the target exhibiting different modulation schemes for the light sources, the identification being the selected modulation schemes.

Further in accordance with embodiments of the invention the identification means of the target may comprise a light source of which the modulation scheme may be selected from measurement to measurement, the identification being the selected modulation scheme.

Further in accordance with embodiments of the invention the identification means of the target may comprise a satellite-positioning system receiver, the identification being the approximate location given by the positioning system.

Further in accordance with embodiments of the invention methods are provided comprising the following steps:

at least one total station is positioned and aligned in a given co-ordinate system;

a target, the position of which is to be measured, exhibiting identification means which are exchanged with a chosen total station of the at least one total stations;

the total station set up to search for said target, using the identification means to identify that the total station is aligned with said target for measurements;

measurements of the location of said target performed by the total station.

In accordance with embodiments of the invention the measurement data may be sent by wireless communication to a memory means.

In accordance with embodiments of the invention the identification means may comprise a modulated light source, the modulation scheme for the light sources being unique to the target, the identification being the selected modulation scheme.

In accordance with embodiments of the invention the identification means may comprise a light source of which the modulation scheme may be set from measurement to measurement, the identification being the selected modulation scheme.

In accordance with embodiments of the invention the identification means may comprise a satellite-positioning system receiver, the identification being the approximate location given by the positioning system.

Embodiments of a target in accordance with the invention comprise a reflector to be used as a target for the distance meter in the total station, a means for enabling the robotic total station to lock on the target, and an identification means, which positively identifies the target to the total station to lock unto the identified target. The identification means at the target may e.g. be either a modulated light source using a selectable modulation scheme, or a GPS receiver to determine the coarse position of the target, the identifying parameter in the first case being the selected modulation scheme and in the second case the coarse position. This identification means is used to enable any total station to determine that a specific target has been identified before locking on it.

The means at the target for enabling the station to lock onto the target may be the reflector itself or an additional means, e.g., a light source. This second light source may be identical to the identification means, also when that is a modulated light source.

Embodiments in accordance with the present invention also provide a unique address for all units in the system to be used in a radio communication net, enabling each unit to select one specific unit for a specific communication.

In embodiments according to invention the identification of a certain target is achieved using a modulated light source, as the identification means on the target, where the modulation scheme (e.g. the modulation frequency) can be changed. Any of a number of predetermined characteristics can be activated by the operator or by a command from one of the other units in the system. The total station can use this specific modulation scheme in different ways.

The total station may in one embodiment identify the specific modulation "on the run" when scanning for the target, and thus neglect all other targets and when the selected target has been identified the station is allowed to lock to the specific target.

The total station may in a second embodiment first lock to a target, during the search procedure for a specific target, and then check the modulation scheme to establish if the actual target locked to was the intended one.

Choosing a specified modulation scheme for a target and giving order to a certain total station to lock to a target using that specific scheme thus achieves the locking of a certain total station to a specific target.

In a further embodiment the specific target may, as is already known within the art, comprise a GPS-receiver at the target for determining its position. The identification means of the selected target will in this embodiment consist of the position given by the GPS-receiver. This information may be translated to a specific total station via the radio communication (wireless link) provided, using the unique address of the specific total station. The total station may then, using the translated positional data, align with the actual target and lock to it.

In a survey where several robotic total stations are used, the user is preferably working at the target. The means for radio communication will then enable the user to select one or more of the possible total stations to lock on the specific target and to measure the location thereof.

This provides the possibility of multiple measurements of the same target using different total stations providing more exact assessment of the location of the specific target.

Providing the targets with a specific identification means, e.g. a specific modulation scheme also allows more than one user to use the same target on a location and discriminate it from other targets. This common specific target may be a target used as a reference target on the location.

Using more than one total station also provides for savings in time in that e.g. in the staking for a road one station may be moved and realigned and the position thereof be ascertained while the surveyor/s keep on measuring and staking out points using another total station.

By providing wireless data communication in each unit the possibility is present to relay data between several units such as to extend the range of the communication. This also provides the possibility of gathering all data at a common means for storing the data, such that there will be no need in downloading data from each unit separately, thus saving time and also security in that the data will be available at the common data storage and also in the individual total stations or the control units at the targets.

The communication will also facilitate for the different units to have access to a common database containing construction data to be used for the survey.

BRIEF DESCRIPTION OF THE DRAWINGS

These and other advantages and features of the present invention will be more readily understood from the following detailed description of the preferred embodiments thereof, when considered in conjunction with the drawings, in which like reference numerals indicate identical structures throughout the several views, and wherein:

FIG. 2 is a schematic illustration of a method of using the system in connection with road construction or the like.

DETAILED DESCRIPTION

Figure 1:
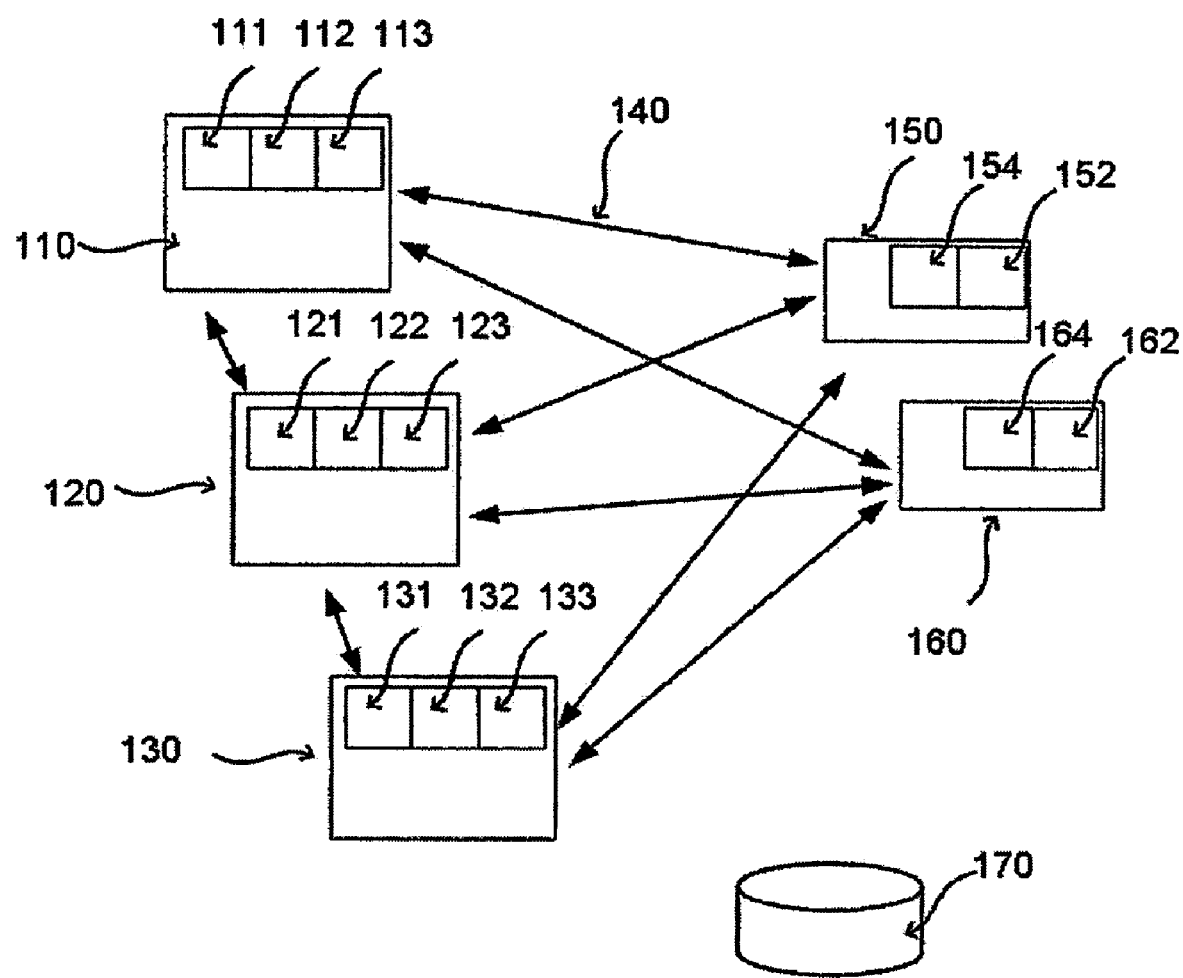
FIG. 1 is a schematic illustration of a preferred embodiment of a system according to the invention.

In a preferred embodiment of the invention, several total stations and targets interact as is shown in the schematic drawing in FIG. 1. Three total stations 110, 120, 130 are shown, each having arrangements 111, 121, 131 for sending out measuring beams for distance and alignment measurements, and beams, and sensor arrangements 112, 122, 132 for receiving the reflected or the transmitted beams from a target.

The sensor for receiving the alignment beam may be adapted to receive the beam from an identification unit at the target, or a separate sensor may be used for detection of this identification. Optical alignment means (telescope) may be arranged in order to align the total station(s) with any known point (not shown). Also provided are units for two-way wireless data communication, 113, 123, and 133, respectively.

The two-way wireless data communication may be of the cellular type, e.g. AMPS, PCS (Personal Communication Service) CDPD (Cellular Digital Packet Data), and GSM using e.g. GPRS (General Packet Radio Service). For these systems the rule is that there must be at least one base station to forward the data information. In areas where this type of service is not provided, e.g., Bluetooth® or Wi-Fi (Wireless Fidelity) may be used or a radio communication system specially for the system devised.

Also shown are targets 150, and 160, each target comprising a reflector (not shown) having units 152 and 162, respectively, for two way wireless data communication and units 154 and 164 for identification of the target.

In this preferred embodiment the identification units are light sources which may be modulated using different selectable modulation schemes. The target may also comprises a control unit (not shown) including a keyboard, a display and a controller to manage the tasks entered via the keyboard and to control the different units. The double-headed arrows 140 indicate both the respective data communication and measuring possibilities within the system. The system may be further provided with a memory means 170, for downloading of measurement data from the total stations and the system may also be provided with suitable maps etc. for the surveying work to be done, which may be stored in the memory means. The memory means is normally provided in the total station and the control units at the targets but may be provided in a separate computer of e.g. the type PC.

When using the system, the user is preferably stationed at one of the targets 150, or 160. The user sends a command using the unique address to the appropriate total station, to align with the target having the appropriate modulation scheme and measures the distance and angles from the total station to that target, as is known within the art. These measurement data are then stored either locally in the total station, or sent via radio to and stored in the control unit at the target or in the central memory means, which are arranged to be addressable by all units (total station and targets) in the system. A second user at target 160 can simultaneously use any non-occupied total station to align to this target and perform corresponding measurements. It has to be understood that a unit occupied with one measuring task will give a notice to any user trying to contact it indicating that it is not available for new task until the first is finished. It is also possible to give users different priorities when asking for service.

An advantage when using this embodiment is that the total stations may be set up in advance in locations on the site, which locations are within measuring distance (line of sight undisturbed) from all possible measurement points on the site, or that at least one total station will be within measuring distance from any chosen point. The user may then choose the appropriate total station(s) to perform the measurement(s). To be taken into account in this instance is the relative distance to the total station chosen and also the relative locations of the chosen stations(s) i.e. two targets may be too close to each other seen from one total station, but not from another total station. Having more than one total station perform the measurement will ascertain a higher precision overall for the data.

It is not certain that all points on a site will be within line of sight for all of the total stations, the site may be a building site where buildings are erected and which will obstruct the view in some directions. The site may also be of an undulating type, the ground itself obstructing the view.

In a second embodiment the identification units 154 and 164 at the target comprises GPS receivers. The identification is then performed by determination of the coarse position (in the range up to a few meters) of the target. Instead of transferring the modulation command to the total station as in the preferred embodiment the coarse position data is instead transferred, and by calculating the approximate direction to the target, the total station can find it and lock to it, provided there is no other target close to the same direction.

Figure 2:
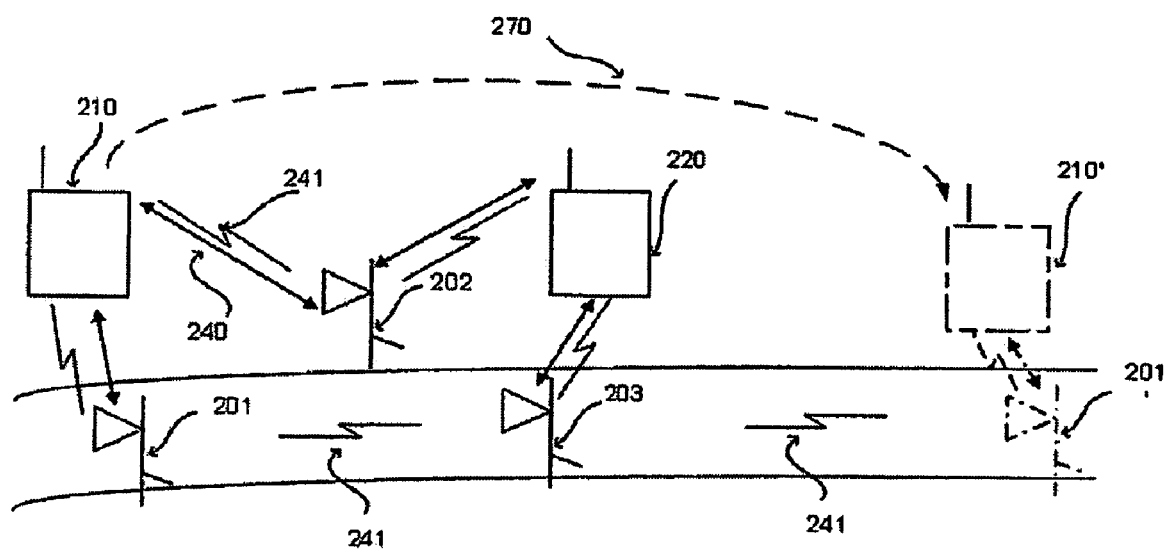

In FIG. 2 a road construction site is shown, it may as well be a railroad or a run-way. In the drawing is shown three targets 201, 202, and 203 for setting out the edges of the roadway.

Shown are also two total stations 210, 220. The measurements are initiated in the same manner as in the previous embodiment. The measurement relative to target 201, 202, and 203 are performed in a first round. The bi-directional wireless communication paths 241, as well as the bi-directional measurement beams 240 are both shown.

The method of locking both total stations 210 and 220 on the same target (in this case 202), can serve either as a check that there is no mismatch between the two total stations e.g. the locations and orientations are correct, or data from both stations can be used to get a higher accuracy of the measurement by averaging the measured position of 202.

It is also apparent that, due to the unique address of every unit, it will be possible to transfer data via radio from station 210 to station 220 even if the radio range is not long enough to do that directly.

There may of course be several more targets, which are within line of sight from the total stations 210 and 220. When all measurements to be performed by the total station 210 has been made, this station is relocated to a new place as indicated in the drawing by the total station 210' and the dashed arrow 270. Also the target 201 is transferred to a new location indicated by 201'.

The manner in which the measurement data are stored and collected is the same as the embodiment shown in FIG. 1.

The advantage of working in this manner is quite clearly that it is a time-saving measure to be able to relocate one total station including the determination and check of the exact new location of the station and the alignment, while work is still going on using the other station(s).

A further advantage of the systems according to the invention is that if there are more than one team at a construction site e.g. they may use the other teams units as each unit has a unique address.

Figure 3:
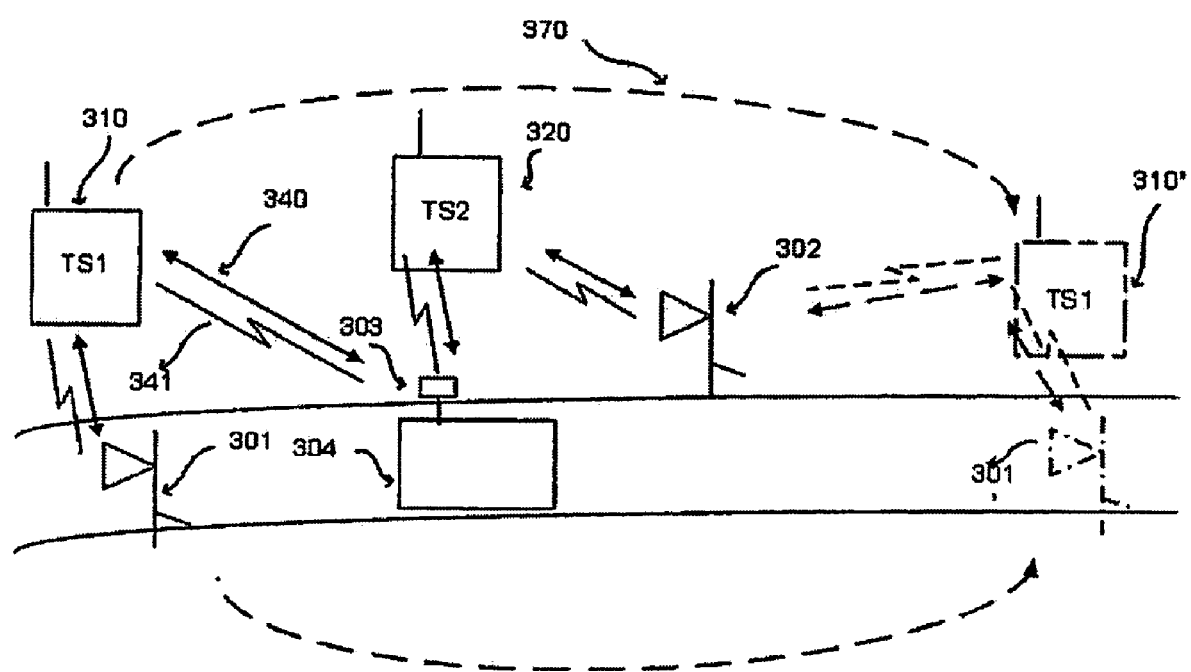
FIG. 3 is a schematic illustration of a method of using the system at a site where moving construction machines are used.

In FIG. 3 a site similar to that in FIG. 2 but having a working machine, e.g. a grader 304 is shown. The working machine has a target/reflector 303 for measuring the location of the working machine. There are two total stations provided 310 and 320, both having measurement means and also radio means for communication between the units of the system. The system shown further comprises two targets 301 and 302 also provided with means for wireless communication and for performing measurements.

The bi-directional wireless communication paths 341 are indicated, as also the bi-directional measurement beams 340.

One or more of the total stations 310, 320 can be used to lock to the target on the machine 303 to guide the machine and control the working part of the machine via the radio link. More sensors can be provided on the machine to determine the position of the working blade in a site coordinate system to facilitate an exact control of the work done by the machine. As the machine proceeds along the road the tracking has to be taken over by the next total station (320). When this is achieved the first station can be moved to a new location along the road (indicated as 310'), without any interruption for the machine to wait for the transfer. Again using a second (302) common target for two stations, a check of the consistency of the new location and orientation can be done.

Figure 4:
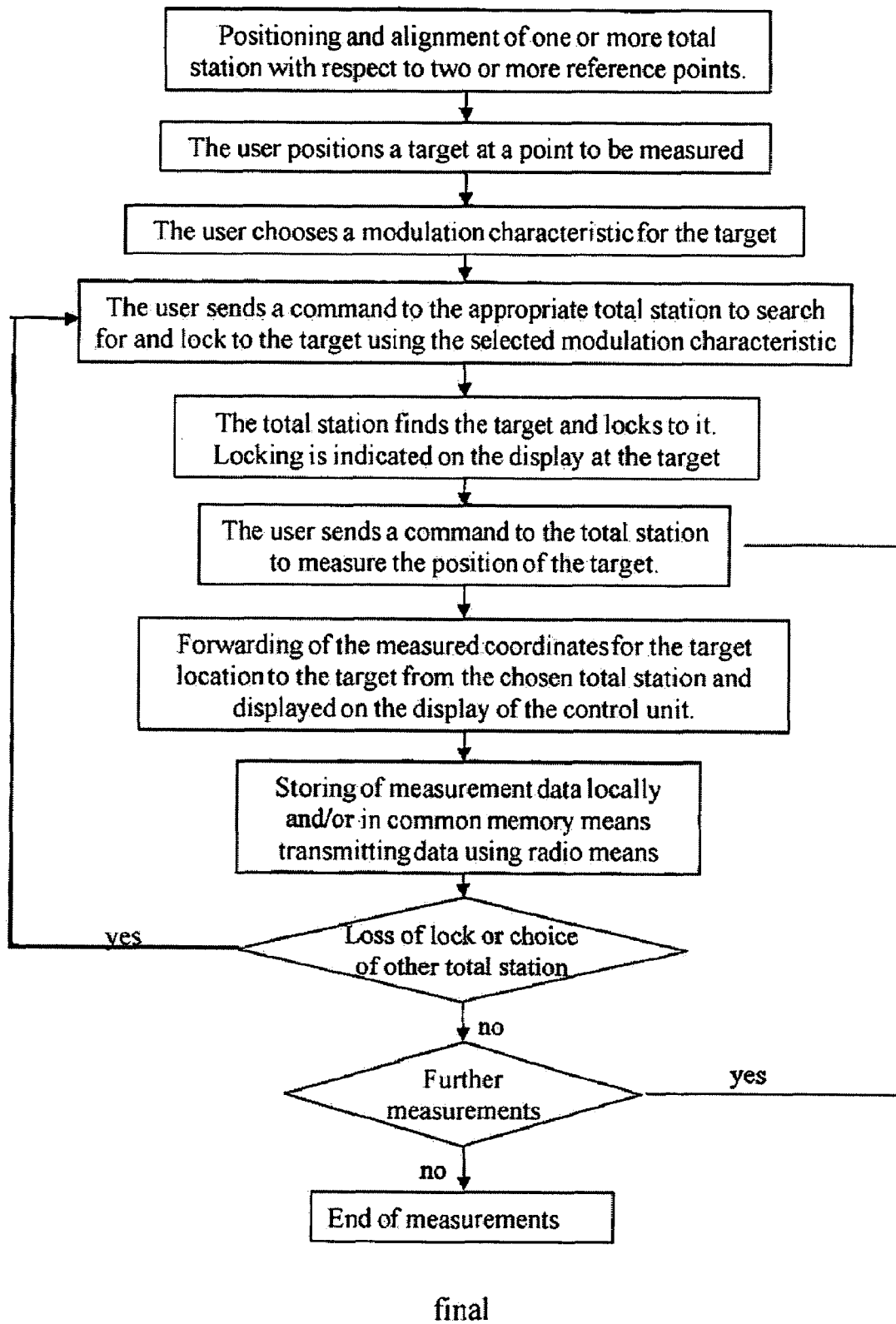
FIG. 4 shows a flowchart of the operation of a system according to the invention.

Referring to FIG. 4, a preferred method of using the system in FIG. 1 according to the invention may be as follows:

Step 1: Positioning and alignment of one or more total station(s) with respect to two or more reference points is performed.

Step 2: The user positions a target at a point to be measured.

Step 3: The user chooses a modulation scheme to characterise the target.

Step 4: The user sends a command to the appropriate total station to search for and lock to the target using the selected modulation scheme.

Step 5: The total station finds the target and locks to it. Lock is indicated on the display at the target. Information may be forwarded to the target via wireless communication or it may be stored in a suitable memory means.

Step 6: The user sends a command to the total station to measure the position of the target.

Step 7: The measured coordinates for the target location are forwarded to the target from the chosen total station and on the display of the control unit.

Step 8: The user stores the coordinate data locally in the control means of the target. Storing of measurement data in a common memory means by transmitting data using radio means can also be performed.

Step 9: Loss of target and choice of total station for new measurements are taken as in step 4.

Step 10: If further measurements needed, the procedure is repeated from step 6.

In the target may also be provided a transponder adapted to react on a transmitted electromagnetic beam, from the total station as the identification means. The transponder will then react and transmit the signal back and possibly add a modulation to the signal.

Embodiments in accordance with the invention can include one or more of the following:

1. A surveying system, comprising at least one total station unit (110, 121, 131; 210, 220; 310, 320), and at least one target (150, 160; 201, 203; 310, 320) said target having wireless communication means (152, 162), each target provided with a unique address for wireless communication, the wireless communication usable for activating a selected total station (110, 121, 131; 210, 220; 310, 320) to identify and measure the location of a chosen target (150, 160; 201, 203; 301, 303), each target (150, 160; 201, 203; 301, 303) having identification means used by the total station for identification of the chosen target, each total station (110, 121, 131; 210, 220; 310, 320) having identifying means used for identification of the chosen target to be measured.

2. A system according to 1 characterized in that the location is measured in relation to a relative reference system.

3. A system according to 1 or 2 characterized in that the identification means (154, 164) of each target in the system comprises a modulated light source, each of the targets exhibiting different modulation schemes for the respective light sources, the identification being the selected modulation scheme.

4. A system according to any of the preceding characterized in that identification means of each target in the system comprises a light source of which the modulation scheme may be set from measurement to measurement such as to give the light sources of targets close to each other different modulation schemes, the identification being the selected modulation scheme.

5. A system according to any of the preceding characterized in that identification means of each target in the system comprises a satellite-positioning system receiver, the identification being the approximate location given by the positioning system.

6. A system according to any of the preceding characterized in that memory means are provided for storing of measurement data.

7. A target to be used in a system according to any of 1-6, in which said target is provided with wireless communication means, and a unique wireless communication address for wireless communication, the wireless communication to be used to activate a selected total station to identify and measure the location of the target in relation to a relative reference system, the target having identification means to be used by the total station for identification of the chosen target.

8. A target according to 7 in which the identification means of the target comprises a modulated light source, the target exhibiting different modulation schemes for the light sources, the identification being the selected modulation schemes.

9. A target according to 7 in which the identification means of the target comprises a light source of which the modulation scheme may be selected from measurement to measurement, the identification being the selected modulation scheme.

10. A target according to 7 in which in that identification means of the target comprises a satellite-positioning system receiver, the identification being the approximate location given by the positioning system.

11. A method of surveying characterized by the following steps:
 at least one total station is positioned and aligned in a given co-ordinate system;
 a target, the position of which is to be measured, exhibiting identification means which are exchanged with a chosen total station of the at least one total stations;
 the total station set up to search for said target, using the identification means to identify that the total station is aligned with said target for measurements;
 measurements of the location of said target performed by the total station.

12. A method according to 11 in which the measurement data sent by wireless communication to a memory means (170).

13. A method according to 9-12 in which the identification means comprises a modulated light source, the modulation scheme for the light sources being unique to the target, the identification being the selected modulation scheme.

14. A method according to 11-12 in which the identification means comprises a light source of which the modulation scheme may be set from measurement to measurement, the identification being the selected modulation scheme.

15. A method according to 10-11 in which the identification means comprises a satellite-positioning system receiver, the identification being the approximate location given by the positioning system.

Figure 5:
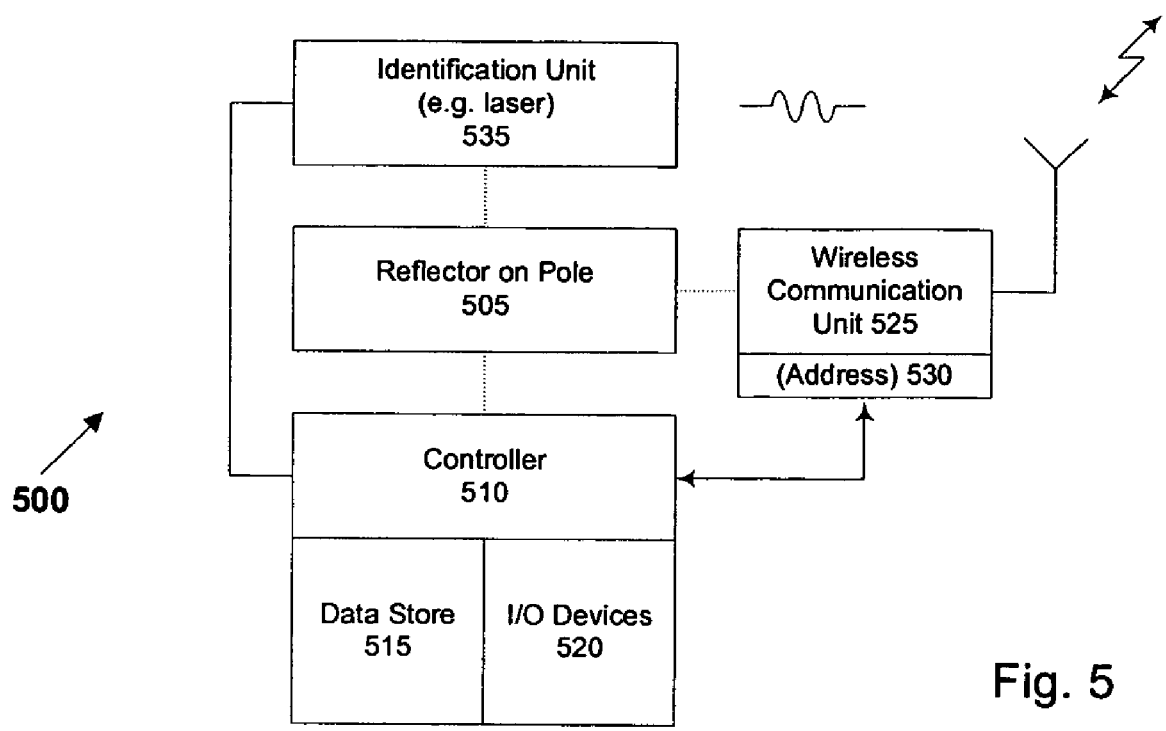
FIG. 5 is a schematic block diagram of a surveying target in accordance with the invention.

FIG. 5 is a schematic block diagram showing an active surveying target 500 in accordance with embodiments of the invention. The target includes a reflector on a pole 505 as is conventional for passive surveying targets. The target further includes a controller 510 having a data store 515 and input/output devices 520 such as a keypad for receiving commands from a human operator and a display panel for displaying information to be viewed by a human operator. A wireless communication unit 525 having an address 530 communicates with controller 510 for sending and receiving data by wireless communication. Address 530 is preferably a unique address allowing communications from target 500 to be recognized as coming from it and allowing communications to be addressed to it.

An identification unit 535 in communication with controller 510 enables a total station to identify target 500. Identification unit 535 can be implemented as (1) a light source such as a laser source which emits light modulated to indicate the identity of the target, (2) a light source such as a laser source which emits a light of a frequency which indicates the identity of the target, and/or (3) a global positioning system receiver to determine and supply an approximate location of the target which indicates the identity of the target. In the case of a global positioning system receiver, the approximate location can be transmitted via modulated light such as a laser and/or via wireless communication. The information which indicates identity of the target, such as the modulation scheme or frequency of the light source, can optionally be modified by command from the controller so that targets which are located in close proximity to one another are assured of being distinguished from one another by a total station attempting to seek and identify a specific target.

Figure 6:
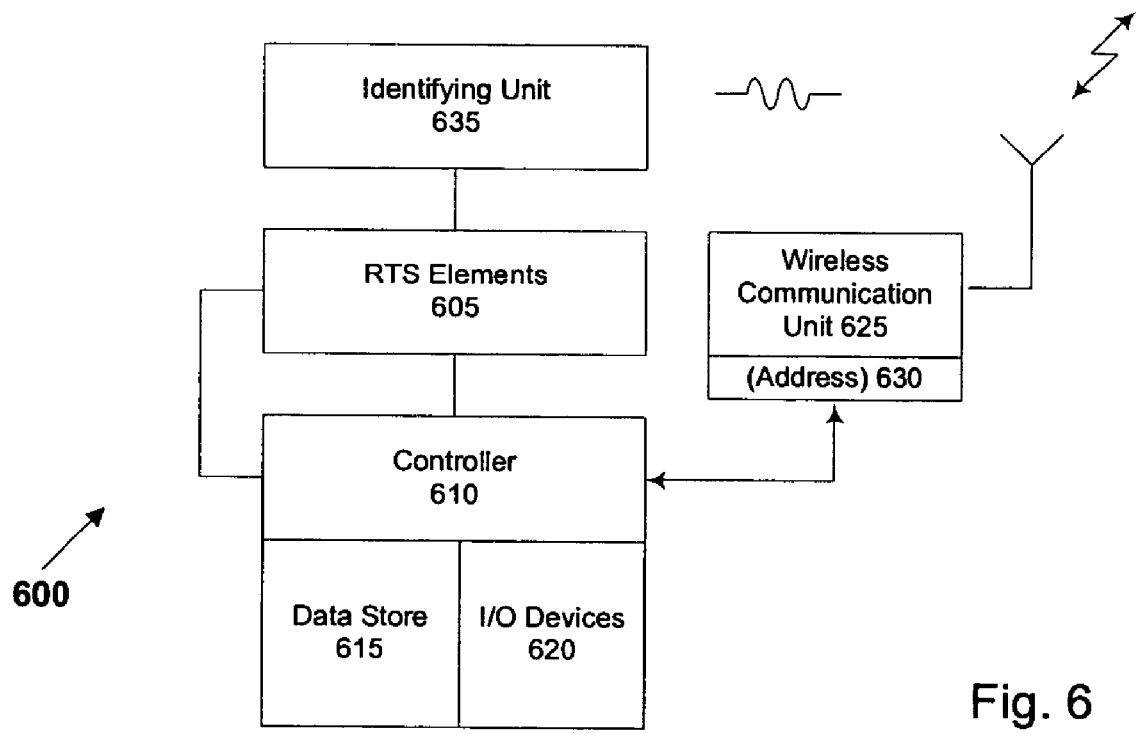
FIG. 6 is a schematic block diagram of a robotic total station in accordance with the invention.

FIG. 6 is a schematic block diagram of a robotic total station 600 in accordance with the invention. Conventional elements of a robotic total station 600 indicated collectively at 605 include a telescope, drive motors for aiming the telescope, angle sensors for detecting azimuth and elevation of the telescope and a distance-measuring unit for measuring distance to a target. In accordance with the invention, robotic total station 600 further includes a controller 610 having a data store 615 and input/output devices 620 such as a keypad for receiving commands from a human operator and a display panel for displaying information to be viewed by a human operator. A wireless communication unit 625 having an address 630 communicates with controller 610 for sending and receiving data by wireless communication. Address 630 is preferably a unique address allowing communications from robotic total station 600 be recognized as coming from it and allowing communications to be addressed to it.

An identifying unit 635 in communication with controller 510 enables total station 600 to identify a target such as target 500 from a signal received from the target, generated for example by (1) a light source such as a laser source which emits light modulated to indicate the identity of the target, (2) a light source such as a laser source which emits a light of a frequency which indicates the identity of the target, and/or (3) a global positioning system receiver at the target to determine and supply an approximate location of the target which indicates the identity of the target. In the case of a global positioning system receiver, the approximate location can be received via modulated light such as a laser and/or via wireless communication.

Figure 7:
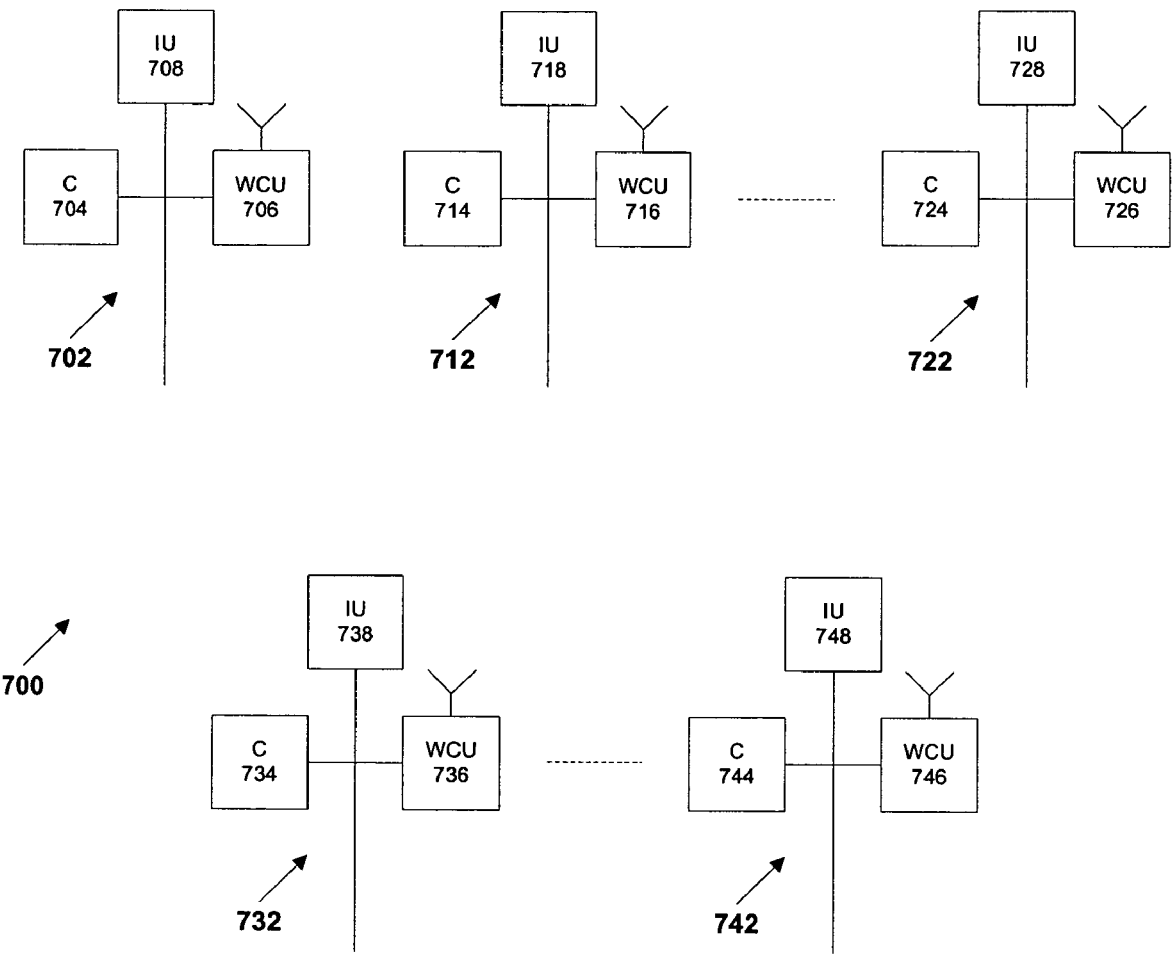
FIG. 7 is a schematic diagram of a surveying system in accordance with the invention.

FIG. 7 is a schematic diagram of a surveying system in accordance with an embodiment of the invention. One or more targets 702, 712, 722 such as target 500 and one or more robotic total stations 732, 742 such as robotic total station 600 are located in a region to be surveyed. The number of targets and total stations can be greater or fewer as needed for the surveying task. Target 712 has a controller 704, a wireless communication unit 706 and an identification unit 708; target 712 has a controller 714, a wireless communication unit 716 and an identification unit 718; target 722 has a controller 724, a wireless communication unit 726 and an identification unit 728. Wireless communication messages can be individually addressed to each target. Each target can be uniquely identified from information provided by its identification unit. Total station 732 has a controller 734, a wireless communication unit 736 and an identifying unit 738; total station 742 has a controller 744, a wireless communication unit 746 and an identifying unit 748. Wireless communication messages can be individually addressed to each total station. The identifying unit of each total station recognizes the identity of a target from information provided by the identification unit of the target.

Figure 8:
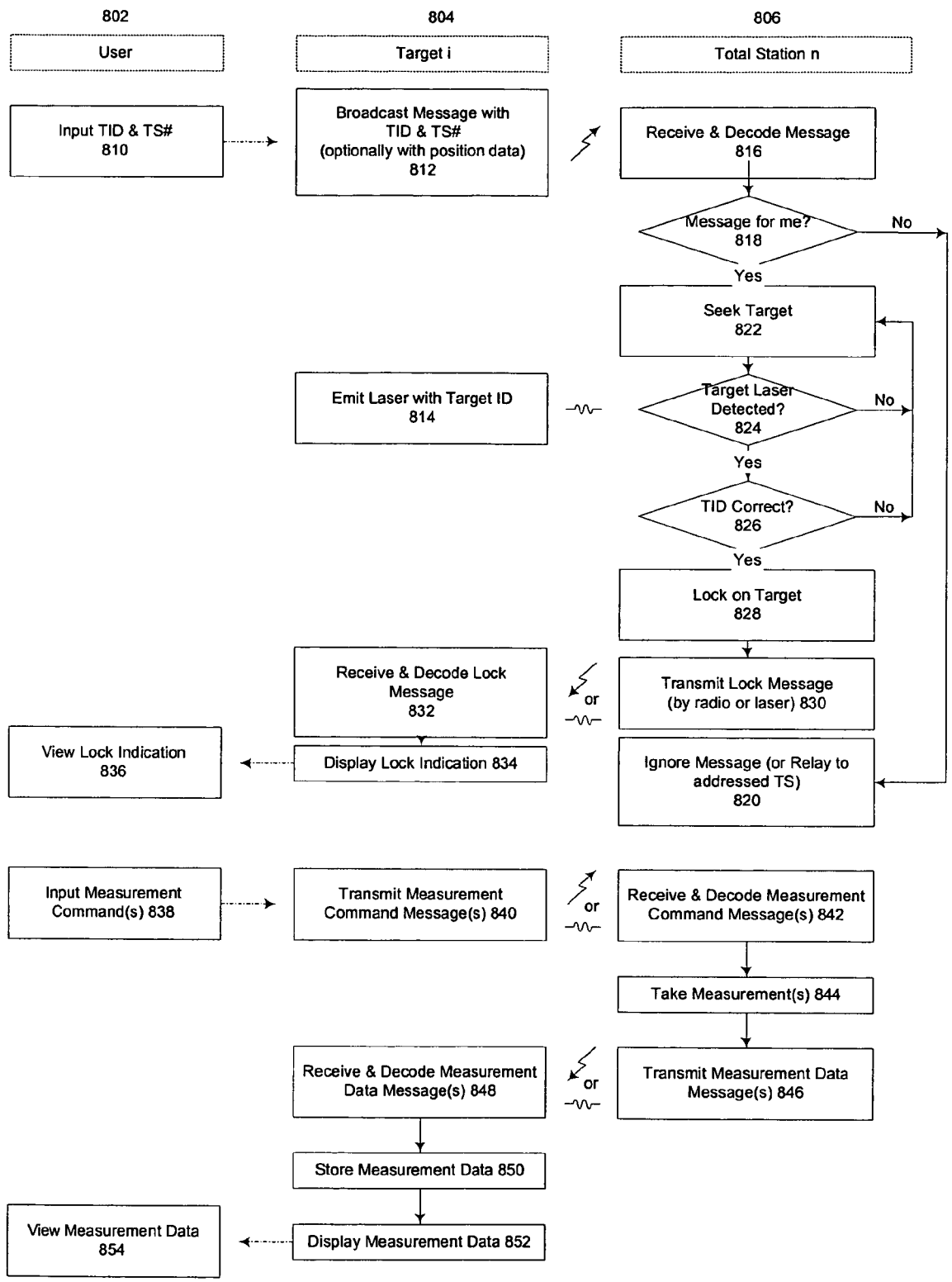
FIG. 8 is a flow diagram illustrating surveying methods in accordance with the invention.

FIG. 8 is a flow diagram 800 illustrating surveying methods in accordance with embodiments of the invention. The diagram is in three columns: column 802 indicates activity of a human user, column 804 indicates activity at a target such as target 500, and column 806 indicates activity at a robotic total station such as robotic total station 600. To begin a survey measurement, a human user located at a selected target enters at 810 the identifier TS# of a robotic total station which is to measure the location of the selected target. The identifier TS# is entered using, for example, a keypad or other input device of the target.

At 812, the target broadcasts a wireless communication message with a target identifier TID and the identifier TS# of the total station which is to make the measurement. If the target is equipped with a global positioning system receiver, the broadcast message optionally includes an approximate location of the target as determined by the global positioning system receiver. The target also emits a laser which identifies the target, e.g., a laser modulated in a way which indicates the identity of the target.

At 816, a robotic total station such as robotic total station 600 receives and decodes the broadcast message. At 818, the message is inspected to determine if it is addressed to this total station. If no, at 820 the message is ignored or, optionally where the total station is equipped with a message forwarding capability, the message is re-transmitted to the total station addressed in the message. If the message is addressed to this total station, at 822 the total station seeks the target. If the message includes an approximate location of the target, the total station can use the approximate location to narrow the field of search for the target and thus reduce the seek time. At 824 is determined whether a target laser has been detected by the total station. If no, the total station continues seeking a target at 822. If yes, at 826 the total station checks whether the detected laser identifies the target as being the target which has requested measurement of its location by this total station. If no, the total station continues seeking the requesting target at 822. If yes, at 828 the total station locks on the identified target. At 830 the total station transmits a lock message to the target by wireless communication or by laser communication.

At 832 the target receives and decodes the lock message. At 834 the target displays a lock indication. At 836 the user views the lock indication and is thereby informed that the total station is ready to make the requested measurement of location of the target. At 838 the user enters a command or commands for one or more measurements to be made. At 840 the target transmits a corresponding measurement-command message, via wireless communication or laser. At 842 the total station receives and decodes the measurement-command message. At 844 the total station takes the requested measurement and, optionally, stores the measurement locally. At 846 the total station transmits one or messages with measurement data, via wireless communication or laser. At 848 the target receives and decodes the measurement message or messages. At 850 the target stores the received measurement data. At 852 the target optionally displays the received measurement data. At 854 the human user optionally views the displayed measurement data.

In addition to the wireless communication possibilities mentioned above, the wireless communication units may be transceivers such as WIT2410 radio transceivers available commercially from Cirronet of Norcross, Ga., USA. The WIT2410 radio transceivers provide wireless connectivity for either point-to-point or multipoint applications. One of the units serves as a base station with which the others are registered and synchronized. In point-to-multipoint network, the base station acts as central communications point and other radios of the network as remotes; remotes cannot communicate directly with each other.

Referring again to FIG. 8, at 820 a message received by the wireless communication unit of a total station serving as a base station is relayed to the wireless communication unit of a total station serving as a remote in the radio network. Whether the message must be decoded and inspected prior to being relayed is a matter of design choice; this may depend, for example, on whether the radio network has a native message-forwarding capability and whether the radios are operated in transparent mode.

Embodiments of the present invention provide survey systems and methods which offer advantages as compared with those known in the art. Although embodiments in accordance with the invention have been described herein, many changes and variations are possible within the spirit and scope of the invention as defined in the claims.

The invention claimed is:

1. A surveying system, comprising:
   a. at least one target having
      i. a unique address for wireless communication,
      ii. a wireless communication unit operable to activate a selected total station to identify and measure location of a chosen target, and
      iii. an identification unit comprising a modulated light source for transmitting modulated light employing a modulation scheme for the modulated light which is unique to the chosen target to enable identification of the chosen target by the selected total station, wherein the modulation scheme is adapted to be modified prior to operating the wireless communication unit to activate the selected total station to search for the chosen target, identify the chosen target and measure location of the chosen target, and b. at least one total station activated by wireless communication to search for the chosen target, identify the chosen target and measure location of the chosen target.

2. The system of claim 1, wherein the total station is operable to measure location in relation to a relative reference system.

3. The system of claim 1, wherein the system comprises a plurality of targets, the light source of each target having a modulation scheme enabling unique identification of the target.

4. The system of claim 1, wherein the system comprises a plurality of targets, the light source of each target having a modulation scheme enabling identification of the target, and wherein the modulation scheme may be set from measurement to measurement such as to give the light sources of targets close to each other different modulation schemes.

5. The system of claim 1, wherein the identification unit comprises a satellite-positioning system receiver to determine an approximate location of the target, and wherein the target is operative to communicate the approximate location to enable identification of the chosen target by the total station.

6. The system of claim 1, further comprising a memory to store measurement data.

7. A surveying target, comprising:
i. a unique address for wireless communication,
ii. a wireless communication unit operable to activate a selected total station to identify and measure location of a chosen target, and
iii. an identification unit comprising a modulated light source for transmitting modulated light employing a modulation scheme for the modulated light which is unique to the chosen target to enable identification of the chosen target by the selected total station, wherein the modulation scheme is adapted to be modified prior to operating the wireless communication unit to activate a selected total station to search for the target, identify the target and measure location of the target.

8. The target of claim 7, wherein the identification unit comprises a light source.

9. The target of claim 8, wherein the light source has a modulation scheme enabling unique identification of the target.

10. The target of claim 8, wherein the light source has a modulation scheme enabling identification of the target, and wherein the modulation scheme may be set from measurement to measurement such as to give the light source of the target a modulation scheme different from a modulation scheme of a nearby target.

11. The target of claim 7, wherein the identification unit comprises a satellite-positioning system receiver to determine an approximate location of the target, and wherein the target is operative to communicate the approximate location to enable identification of the chosen target by the total station.

12. A method of surveying with at least one total station positioned and aligned in a coordinate system, comprising:
a. Placing a target at a location to be measured, the target having: a unique address for wireless communication, a wireless communication unit operable to activate a selected total station to search for the target, identify the target and measure location of the target, and an identification unit comprising a modulated light source enabling identification of the chosen target by the selected total station,
b. Transmitting modulated light from the identification unit employing a modulation scheme for the modulated light which is unique to the target to enable identification of the target by the selected total station,
c. Modifying the modulation scheme prior to operating the wireless communication unit to activate a selected total station to search for the target, identify the target and measure location of the target, and
d. Operating the wireless communication unit to activate a selected total station to search for the target, identify the target and measure location of the target.

13. The method of claim 12, further comprising: transmitting data representing a measured location of the target from the selected total station by wireless communication for storage in a memory remote from the selected total station.

14. The method of claim 12, wherein the identification unit comprises a light source, the method further comprising: transmitting light from the identification unit to enable identification of the target by the selected total station.

15. The method of claim 12, wherein the identification unit comprises a satellite-positioning system receiver to determine an approximate location of the target, and wherein operating the wireless communication unit to activate a selected total station to search for the target, identify the target and measure location of the target comprises communicating the approximate location to enable identification of the chosen target by the total station.

* * * * *